United States Patent
Canik et al.

(10) Patent No.: US 12,013,075 B2
(45) Date of Patent: Jun. 18, 2024

(54) INSULATED EXHAUST GAS CONDUIT SYSTEMS

(71) Applicant: Cummins Emission Solutions Inc., Columbus, IN (US)

(72) Inventors: Jacob D. Canik, Stoughton, WI (US); Andrew Komisarek, Madison, WI (US); Corey Verseman, Fitchburg, WI (US)

(73) Assignee: Cummins Emission Solutions Inc, Columbus, IN (US)

( * ) Notice: Subject to any disclaimer, the term of this patent is extended or adjusted under 35 U.S.C. 154(b) by 88 days.

(21) Appl. No.: 17/785,291

(22) PCT Filed: Dec. 17, 2019

(86) PCT No.: PCT/US2019/066825
§ 371 (c)(1),
(2) Date: Jun. 14, 2022

(87) PCT Pub. No.: WO2021/126166
PCT Pub. Date: Jun. 24, 2021

(65) Prior Publication Data
US 2023/0009619 A1    Jan. 12, 2023

(51) Int. Cl.
*F16L 59/18* (2006.01)
*F01N 13/14* (2010.01)
*F16L 21/06* (2006.01)

(52) U.S. Cl.
CPC .......... *F16L 59/182* (2013.01); *F01N 13/148* (2013.01); *F16L 21/065* (2013.01)

(58) Field of Classification Search
CPC .................................................. F16L 59/182
See application file for complete search history.

(56) References Cited

U.S. PATENT DOCUMENTS 3,491,171 A * 1/1970 Walter .................. F16L 59/182
                                                       138/146
3,492,029 A * 1/1970 French .................. F16L 59/182
                                                       285/47
(Continued)

FOREIGN PATENT DOCUMENTS

EP    0017254 A1 * 10/1980 ............ F16L 59/182
EP    0908662 A1 *  4/1999 ............ F16L 59/182
(Continued)

OTHER PUBLICATIONS

Office Action in Chinese Patent Application No. 201980103044.8, dated Mar. 10, 2023.
(Continued)

*Primary Examiner* — Matthew Troutman
*Assistant Examiner* — Fannie C Kee
(74) *Attorney, Agent, or Firm* — Foley & Lardner LLP

(57) ABSTRACT

An insulated exhaust gas conduit system includes a first exhaust gas conduit, a second exhaust gas conduit, a first insulation sleeve, and a second insulation sleeve. The first exhaust gas conduit has a first exhaust gas conduit end portion. The second exhaust gas conduit has a second exhaust gas conduit end portion that is configured to engage with the first exhaust gas conduit end portion. The first insulation sleeve includes a first insulation sleeve insulation layer and a first insulation sleeve heat shield. The first insulation sleeve insulation layer is disposed around the first exhaust gas conduit. The first insulation sleeve heat shield is disposed around the first insulation sleeve insulation layer. The first insulation sleeve extends beyond the first exhaust gas conduit end portion. The second insulation sleeve includes a second insulation sleeve insulation layer and a second insulation sleeve heat shield.

22 Claims, 6 Drawing Sheets

(56) References Cited

U.S. PATENT DOCUMENTS

| | | | |
|---|---|---|---|
| 3,563,572 A * | 2/1971 | French | F16L 59/182 |
| | | | 285/47 |
| 3,850,453 A | 11/1974 | Bentley et al. | |
| 4,084,842 A * | 4/1978 | Stonitsch | F16L 59/182 |
| | | | 285/123.17 |
| 9,650,933 B2 * | 5/2017 | Chiruta | F16L 59/182 |
| 2007/0210577 A1 | 9/2007 | Pollack et al. | |
| 2015/0226368 A1 | 8/2015 | Schellin et al. | |
| 2018/0187801 A1 | 7/2018 | Czaplewski et al. | |

FOREIGN PATENT DOCUMENTS

| | | | | |
|---|---|---|---|---|
| FR | 2797490 A1 * | 2/2001 | | F16L 59/182 |
| JP | 2012-167569 A | 9/2012 | | |
| WO | WO-97/38258 A | 10/1997 | | |

OTHER PUBLICATIONS

International Search Report and Written Opinions issued in PCT Application No. PCT/US2019/066825 dated Mar. 9, 2020, 16 pages.

* cited by examiner

INSULATED EXHAUST GAS CONDUIT SYSTEMS

CROSS-REFERENCE TO RELATED APPLICATION

The present application is a National Stage of PCT application No. PCT/US2019/066825, filed Dec. 17, 2019. The contents of this application are hereby incorporated by reference in their entirety.

TECHNICAL FIELD

The present application relates generally to the field of insulated exhaust gas conduit systems for internal combustion engines.

BACKGROUND

An engine produces exhaust gas that is typically provided to atmosphere via a series of conduits. Insulation may be provided around the conduits to mitigate transfer of heat from the exhaust gas to items surrounding the conduits. Typically, the insulation is wrapped around each conduit. Joints between conduits may be exposed (e.g., not wrapped with insulation, etc.) or may be separately wrapped with insulation. In either case, it may be difficult to desirably mitigate transfer of heat from the exhaust gas at the joints.

SUMMARY

In some vehicles, insulation is used to insulate exhaust gas conduits (e.g., tubes or pipes) of an exhaust gas aftertreatment system. The joints of the exhaust gas conduits are often left uninsulated. If insulation is used around the joints, the insulation may be in separate pieces. However, these pieces are bulky and are an additional service part. Therefore, using separate pieces of insulation for joint coverage causes an increase in time and cost of sourcing, manufacturing, and servicing (installation and repair/replacement).

Additionally, the separate pieces may add to the overall space claim of the system. The space claim is the amount of physical space that an exhaust gas aftertreatment system consumes when installed (e.g., on a vehicle, etc.) and the location (e.g., coordinates relative to a vehicle coordinate system, etc.) of the physical space that is consumed by the exhaust gas aftertreatment system when installed. In some applications, the physical space available for use by an exhaust gas aftertreatment system is limited due to the locations of surrounding components, wiring or piping requirements, or other similar constraints. As such, it is often difficult to modify an exhaust gas aftertreatment system because such modifications typically increase the space claim of the exhaust gas aftertreatment system. Such modifications may be desired when it is desired to utilize various components, such as different types of dosing modules, in the exhaust gas aftertreatment system.

To address this issue, the present disclosure describes an insulated exhaust gas conduit system that may allow joints in and around the exhaust gas aftertreatment system to be insulated without the need for separate manufacturing or service parts or processes, while keeping the space claim to a minimum.

In one embodiment, an insulated exhaust gas conduit system includes a first exhaust gas conduit, a second exhaust gas conduit, a first insulation sleeve, and a second insulation sleeve. The first exhaust gas conduit has a first exhaust gas conduit end portion. The second exhaust gas conduit has a second exhaust gas conduit end portion that is configured to engage with the first exhaust gas conduit end portion. The first insulation sleeve includes a first insulation sleeve insulation layer and a first insulation sleeve heat shield. The first insulation sleeve insulation layer is disposed around the first exhaust gas conduit. The first insulation sleeve heat shield is disposed around the first insulation sleeve insulation layer. The first insulation sleeve extends beyond the first exhaust gas conduit end portion. The second insulation sleeve includes a second insulation sleeve insulation layer and a second insulation sleeve heat shield. The second insulation sleeve insulation layer is disposed around the second exhaust gas conduit. The second insulation sleeve heat shield is disposed around the second insulation sleeve insulation layer. The second exhaust gas conduit end portion is exposed from the second insulation sleeve. The first insulation sleeve is disposed around the second exhaust gas conduit end portion.

In another embodiment, an insulated exhaust gas conduit system includes a first exhaust gas conduit, a second exhaust gas conduit, a first insulation layer, a second insulation layer, a first heat shield, a second heat shield, and an exhaust gas conduit clamp. The first exhaust gas conduit has a first exhaust gas conduit end portion. The second exhaust gas conduit has a second exhaust gas conduit end portion that is configured to couple to the first exhaust gas conduit end portion at a joint. The second exhaust gas conduit end portion includes a flange that is configured to overlap the first exhaust gas conduit end portion at the joint. The first insulation layer is disposed on the first exhaust gas conduit. The first insulation layer extends beyond the first exhaust gas conduit end portion. The second insulation layer is disposed on the second exhaust gas conduit. The second insulation layer ends before the second exhaust gas conduit end portion, such that the second exhaust gas conduit end portion is exposed from the second insulation layer. The first heat shield is disposed on the first insulation layer. The second heat shield is disposed on the second insulation layer. The exhaust gas conduit clamp is configured to secure the first exhaust gas conduit to the second exhaust gas conduit at the joint. The exhaust gas conduit clamp has a connection portion that connect ends of the exhaust gas conduit clamp to one another. A cutout portion of the first insulation layer and the first heat shield is configured to expose the connection portion.

In yet another embodiment, an insulated exhaust gas conduit system includes a first exhaust gas conduit and a first insulation sleeve. The first exhaust gas conduit includes a first exhaust gas conduit body and a first exhaust gas conduit end portion. The first exhaust gas conduit body is defined by a center axis. The first exhaust gas conduit end portion is contiguous with first exhaust gas conduit body and extends from the first exhaust gas conduit body towards the center axis. The first insulation sleeve includes a first insulation sleeve insulation layer and a first heat shield. The first insulation sleeve insulation layer includes a first insulation sleeve insulation layer body and a first insulation sleeve insulation layer end portion. The first insulation sleeve insulation layer body is in confronting relation with the first exhaust gas conduit. The first insulation sleeve insulation layer end portion is contiguous with the first insulation sleeve insulation layer body and separated from the first exhaust gas conduit. The first heat shield includes a first heat shield body and a first heat shield end portion. The first heat shield body is in confronting relation with the first insulation sleeve insulation layer body and separated from the first exhaust gas conduit by the first insulation sleeve insulation layer body. The first heat shield end portion is contiguous with the first heat shield body, in confronting relation with the first insulation sleeve insulation layer end portion, and extends away from the first heat shield body towards the center axis. The first heat shield end portion is separated from the first exhaust gas conduit end portion along the center axis such that the first insulation sleeve insulation layer end portion extends between the first heat shield end portion and the first exhaust gas conduit end portion along the center axis.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
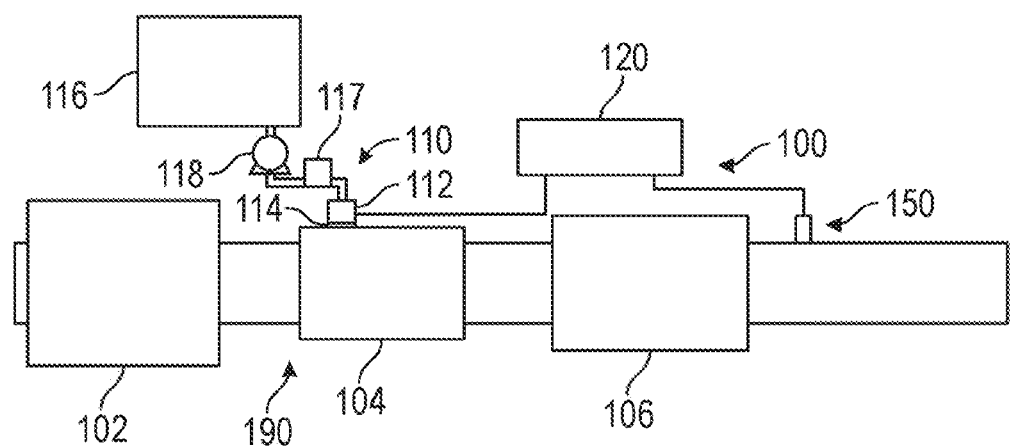
FIG. 1 is a block schematic diagram of an example exhaust gas aftertreatment system.

It will be recognized that some or all of the Figures are schematic representations for purposes of illustration. The Figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for insulating exhaust gas conduits for internal combustion engines. The various concepts introduced above and discussed in greater detail below may be implemented in any of numerous ways, as the described concepts are not limited to any particular manner of implementation. Examples of specific implementations and applications are provided primarily for illustrative purposes.

I. Overview

In some vehicles, insulation is used to insulate exhaust gas conduits (e.g., tubes or pipes) of an exhaust gas aftertreatment system. The joints of the exhaust gas conduits are often left uninsulated. If insulation is used around the joints, the insulation may be in separate pieces. However, these pieces are bulky and are an additional service part. Therefore, using separate pieces of insulation for joint coverage causes an increase in time and cost of sourcing, manufacturing, and servicing (installation and repair/replacement).

Additionally, the separate pieces may add to the overall space claim of the system. The space claim is the amount of physical space that an exhaust gas aftertreatment system consumes when installed (e.g., on a vehicle, etc.) and the location (e.g., coordinates relative to a vehicle coordinate system, etc.) of the physical space that is consumed by the exhaust gas aftertreatment system when installed. In some applications, the physical space available for use by an exhaust gas aftertreatment system is limited due to the locations of surrounding components, wiring or piping requirements, or other similar constraints. As such, it is often difficult to modify an exhaust gas aftertreatment system because such modifications typically increase the space claim of the exhaust gas aftertreatment system. Such modifications may be desired when it is desired to utilize various components, such as different types of dosing modules, in the exhaust gas aftertreatment system.

To address this issue, implementations described herein provide an insulated exhaust gas conduit system that may allow joints in and around the exhaust gas aftertreatment system to be insulated without the need for separate manufacturing or service parts or processes, while keeping the space claim to a minimum.

According to some embodiments described herein, an insulated exhaust gas conduit system is installed on an aftertreatment system, such that insulation is wrapped around the exhaust gas conduits, including the exhaust gas conduit joint. This can be accomplished by extending the existing insulation and heat shield over the joint. Extending the insulation and heat shield retains the low profile, reduces service parts, creates an easier installation process, and importantly, insulates more surface area, including the exhaust gas conduit joint. The insulated exhaust gas conduit system includes a first exhaust gas conduit, a second exhaust gas conduit, a first insulation sleeve, and a second insulation sleeve. The first insulation sleeve has a first insulation sleeve insulation layer and a first insulation sleeve heat shield. The second insulation sleeve has a second insulation sleeve insulation layer and a second insulation sleeve heat shield. The first exhaust gas conduit and the second exhaust gas conduit are configured to couple together. This coupling point is what is referred to herein as a joint. To facilitate the coupling, the second exhaust gas conduit includes a flange which is received by a channel within the first insulation sleeve. The first insulation sleeve insulation layer and first insulation sleeve heat shield overlap the flange, which overlaps a portion of the first exhaust gas conduit, such that the first insulation sleeve heat shield meets the second insulation sleeve heat shield. As such, the joint is insulated.

By increasing the insulated area of the aftertreatment system improved heat retention capability of the aftertreatment system is achieved, which leads to increased performance of the system. Further, insulating the joints reduces heat rejection to the surrounding components (e.g., components of the engine system surrounding the exhaust gas conduits, etc.), improves the radial space claim, and reduces service time of the system.

II. Overview of Exhaust Gas Aftertreatment System

FIG. 1 depicts an exhaust gas aftertreatment system 100 having an example reductant delivery system 110 for an exhaust gas conduit system 190. The exhaust gas aftertreatment system 100 includes a particulate filter, for example a diesel particulate filter (DPF) 102, the reductant delivery system 110, a decomposition chamber or reactor pipe 104, a SCR catalyst 106, and a sensor 150.

The DPF 102 is configured to remove particulate matter, such as soot, from exhaust gas flowing in the exhaust gas conduit system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea or diesel exhaust gas fluid (DEF), into ammonia. The decomposition chamber 104 is associated with the reductant delivery system 110 having a doser 112 configured to dose the reductant into the decomposition chamber 104. In some implementations, the reductant is injected upstream of the SCR catalyst 106. The reductant droplets then undergo the processes of evaporation, thermolysis, and hydrolysis to form gaseous ammonia within the exhaust gas conduit system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The decomposition chamber 104 includes the doser 112 mounted to the decomposition chamber 104 such that the doser 112 may dose the reductant into the exhaust gases flowing in the exhaust gas conduit system 190. The doser 112 may include an insulator 114 interposed between a portion of the doser 112 and the portion of the decomposition chamber 104 to which the doser 112 is mounted. The doser 112 is fluidly coupled to one or more reductant sources 116. In some implementations, a pump 118 may be used to pressurize the reductant from the reductant source 116 for delivery to the doser 112. In some implementations, a filter assembly 117 can be positioned between the reductant source 116 and the doser 112. The filter assembly 117 can be upstream or downstream of the pump 118. In other implementations, the filter assembly 117 can be integrated into the pump 118. In still other implementations, the filter assembly 117 can be integrated into the doser 112 and/or reductant source 116. The filter assembly 117 can include a filter housing, a filter media, and one or more valves, as described in greater detail below.

The doser 112 and the pump 118 are also electrically or communicatively coupled to a controller 120. In some implementations, the one or more valves can be electrically or communicatively coupled to the controller 120. The controller 120 is configured to control the doser 112 to dose reductant into the decomposition chamber 104. The controller 120 may also be configured to control the pump 118 and/or the filter assembly 117. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes inlet in fluid communication with the decomposition chamber 104 from which exhaust gas and reductant is received and an outlet in fluid communication with an end of the exhaust gas conduit system 190.

The exhaust gas conduit system 190 may further include an oxidation catalyst, for example a diesel oxidation catalyst (DOC), in fluid communication with the exhaust gas conduit system 190 (e.g., downstream of the SCR catalyst 106 or upstream of the DPF 102) to oxidize hydrocarbons and carbon monoxide in the exhaust gas.

In some implementations, the DPF 102 may be positioned downstream of the decomposition chamber or reactor pipe 104. For instance, the DPF 102 and the SCR catalyst 106 may be combined into a single unit, such as a DPF with SCR-coating (SDPF). In some implementations, the doser 112 may instead be positioned downstream of a turbocharger or upstream of a turbocharger.

The sensor 150 may be coupled to the exhaust gas conduit system 190 to detect a condition of the exhaust gas flowing through the exhaust gas conduit system 190. In some implementations, the sensor 150 may have a portion disposed within the exhaust gas conduit system 190, such as a tip of the sensor 150 may extend into a portion of the exhaust gas conduit system 190. In other implementations, the sensor 150 may receive exhaust gas through another conduit, such as a sample pipe extending from the exhaust gas conduit system 190. While the sensor 150 is depicted as positioned downstream of the SCR catalyst 106, it should be understood that the sensor 150 may be positioned at any other position of the exhaust gas conduit system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106.

III. Example Insulated Exhaust Gas Conduit System

FIGS. 2-5 illustrate an insulated exhaust gas conduit system 200, according to an example embodiment. As is explained in more detail herein, the insulated exhaust gas conduit system 200 is configured to provide insulation (e.g., thermal insulation, etc.) for a joint (e.g., body joint, coupling joint, etc.) between two adjacent components of the exhaust gas aftertreatment system 100. For example, the insulated exhaust gas conduit system 200 may provide insulation for a joint between two adjacent exhaust gas conduits of the exhaust gas conduit system 190. In this way, the insulated exhaust gas conduit system 200 may mitigate transfer of heat from exhaust gas produced by an internal combustion engine (e.g., diesel internal combustion engine, gasoline internal combustion engine, etc.) to components (e.g., wires, bushings, sensors, etc.) surrounding the insulated exhaust gas conduit system 200. As a result, impacts to components surrounding the insulated exhaust gas conduit system 200 due to heat (e.g., melting of the components, stretching of the components, etc.) may be minimized.

The insulated exhaust gas conduit system 200 includes a first insulation sleeve 202. The first insulation sleeve 202 is disposed around (e.g., overlapped around, wrapped around, covers, overlaps, etc.) a first exhaust gas conduit 204 of the exhaust gas conduit system 190. As is explained in more detail here, the first insulation sleeve 202 is configured to thermally insulate the first exhaust gas conduit 204 such that transfer of heat out of the first insulation sleeve 202 from the exhaust gas contained within (e.g., flowing through, etc.) the first exhaust gas conduit 204 is mitigated.

The first insulation sleeve 202 includes a first insulation sleeve insulation layer 206. As is explained in more detail herein, the first insulation sleeve insulation layer 206 is configured to reduce transfer of heat from exhaust gas contained within the first exhaust gas conduit 204 out of the insulated exhaust gas conduit system 200 (e.g., towards components of the exhaust gas aftertreatment system 100 that are adjacent to the first exhaust gas conduit 204, etc.).

The first insulation sleeve insulation layer 206 includes a first insulation sleeve insulation layer body 207. The first insulation sleeve insulation layer body 207 is disposed around a portion of the first exhaust gas conduit 204. In applications where the first exhaust gas conduit 204 is substantially cylindrical, the first insulation sleeve insulation layer body 207 may be substantially cylindrical.

The first insulation sleeve insulation layer 206 also includes a first insulation sleeve insulation layer end 208. The first insulation sleeve insulation layer end 208 is contiguous with the first insulation sleeve insulation layer body 207. The first insulation sleeve insulation layer end 208 axially extends from the first insulation sleeve insulation layer body 207 away from the first insulation sleeve insulation layer body 207 (e.g., along an axis that is parallel to a center axis of the first insulation sleeve insulation layer body 207, etc.). Unlike the first insulation sleeve insulation layer body 207, the first insulation sleeve insulation layer end 208 is separated from (e.g., not in contact with, spaced apart from, etc.) the first exhaust gas conduit 204.

The first insulation sleeve insulation layer end 208 includes a first insulation sleeve insulation layer end surface 209 (e.g., end face, etc.). The first insulation sleeve insulation layer end surface 209 is a radially-extending end surface (e.g., the first insulation sleeve insulation layer end surface 209 extends towards the first exhaust gas conduit 204, etc.).

The first insulation sleeve insulation layer end 208 is defined by a length Q. In various embodiments, the length Q is approximately equal to between 1 inch and 3 inches, inclusive (e.g., 0.95 inches, 1 inch, 1.5 inches, 2 inches, 3 inches, 3.05 inches, etc.). In various embodiments, the length Q is approximately equal to between 1 inch and 6 inches, inclusive (e.g., 3 inches, 4.05 inches, 5.5 inches, etc.). In various embodiments, the length Q is approximately equal to between 1 inch and 10 inches, inclusive (e.g., 0.95 inches, 2.5 inches, 7 inches, 9.95 inches, etc.). In other words, the first insulation sleeve insulation layer end 208 is separated from the first exhaust gas conduit 204 along the length Q.

The first exhaust gas conduit 204 includes a first exhaust gas conduit body 210. The first exhaust gas conduit body 210 interfaces with the first insulation sleeve insulation layer body 207. In various embodiments, the first exhaust gas conduit body 210 is cylindrical.

The first exhaust gas conduit 204 also includes a first exhaust gas conduit end portion 211. The first exhaust gas conduit end portion 211 is contiguous with the first exhaust gas conduit body 210. The first exhaust gas conduit end portion 211 extends axially from the first exhaust gas conduit body 210 away from the first exhaust gas conduit body 210. In various embodiments, the first exhaust gas conduit end portion 211 additionally extends radially away from the first exhaust gas conduit body 210 (e.g., towards a center axis of the first exhaust gas conduit body 210, etc.).

The first exhaust gas conduit end portion 211 includes a first exhaust gas conduit end surface 212 (e.g., end face, etc.). The first exhaust gas conduit end surface 212 is a radially-extending end surface (e.g., the first exhaust gas conduit end surface 212 extends away from the first insulation sleeve insulation layer end 208, etc.).

The first insulation sleeve insulation layer end surface 209 is separated from the first exhaust gas conduit end surface 212 by an overhang distance G. In other words, the first insulation sleeve insulation layer end surface 209 axially protrudes from the first exhaust gas conduit 204 by the overhang distance G. In various embodiments, the overhang distance G is approximately equal to (e.g., within 5% of, equal to, etc.) between 0.25 inches and 2 inches, inclusive (e.g., 0.23 inches, 0.25 inches, 0.5 inches, 1 inch, 2 inches, 2.05 inches, etc.).

The first insulation sleeve insulation layer 206 includes an insulation sleeve insulation layer recess 213. The insulation sleeve insulation layer recess 213 is contiguous with the first insulation sleeve insulation layer end surface 209 and extends beyond the first exhaust gas conduit end portion 211 and along the first exhaust gas conduit 204 away from the first insulation sleeve insulation layer end 208 by the length Q. In various embodiments, the length Q is approximately equal to between 2G and 5G, inclusive. The insulation sleeve insulation layer recess 213 cooperates with the first exhaust gas conduit 204 to form a channel 214 (e.g., groove, notch, etc.). The channel 214 is a void (e.g., cavity, gap, etc.) between the first insulation sleeve insulation layer end 208 and the first exhaust gas conduit 204 (e.g., the first exhaust gas conduit body 210, the first exhaust gas conduit end portion 211, etc.).

The length Q less the overhang distance G is equal to a distance I. As is explained in more detail herein, the distance I may be related to a width of a clamp used to couple the first exhaust gas conduit 204 to a second exhaust gas conduit. In other words, the clamp may be selected such that a width of the clamp is less than the distance I.

The first insulation sleeve 202 also includes a first insulation sleeve heat shield 216 (e.g., wrap, covering, skin, shell, etc.). The first insulation sleeve heat shield 216 is configured to further reduce transfer of heat from exhaust gas contained within the first exhaust gas conduit 204 out of the insulated exhaust gas conduit system 200.

The first insulation sleeve heat shield 216 includes a first insulation sleeve heat shield body 217. The first insulation sleeve heat shield body 217 is disposed around the first insulation sleeve insulation layer body 207 and the first insulation sleeve insulation layer end 208. The first insulation sleeve heat shield body 217 is separated from the first exhaust gas conduit 204 by the first insulation sleeve insulation layer 206.

The first insulation sleeve heat shield 216 also includes a first insulation sleeve heat shield end portion 218. The first insulation sleeve heat shield end portion 218 is contiguous with the first insulation sleeve heat shield body 217. The first insulation sleeve heat shield end portion 218 extends away from the first insulation sleeve heat shield body 217. The first insulation sleeve heat shield end portion 218 is a radially-extending end portion.

The first insulation sleeve heat shield end portion 218 interfaces with the first insulation sleeve insulation layer end surface 209. As a result, the first insulation sleeve insulation layer 206 is at least partially enveloped (e.g., covered, etc.) by the first insulation sleeve heat shield 216.

The first insulation sleeve 202 is configured to receive a second exhaust gas conduit 220 of the exhaust gas conduit system 190. The second exhaust gas conduit 220 includes a second exhaust gas conduit body 221. In various embodiments, the second exhaust gas conduit body 221 is cylindrical.

The second exhaust gas conduit 220 also includes a second exhaust gas conduit end portion 222. The second exhaust gas conduit end portion 222 is contiguous with the second exhaust gas conduit body 221. The second exhaust gas conduit end portion 222 extends axially from the second exhaust gas conduit body 221 away from the second exhaust gas conduit body 221. In various embodiments, the second exhaust gas conduit end portion 222 additionally extends radially away from the second exhaust gas conduit body 221 (e.g., away from a center axis of the second exhaust gas conduit body 221, etc.).

The second exhaust gas conduit end portion 222 includes a second exhaust gas conduit flange 223. The second exhaust gas conduit flange 223 is contiguous with the second exhaust gas conduit body 221 and extends away from the second exhaust gas conduit body 221. The second exhaust gas conduit flange 223 has a diameter that increases as a distance from the second exhaust gas conduit body 221 increases.

The second exhaust gas conduit end portion 222 includes a second exhaust gas conduit collar 224. The second exhaust gas conduit collar 224 is contiguous with the second exhaust gas conduit flange 223 and separated from the second exhaust gas conduit body 221 by the second exhaust gas conduit flange 223. The second exhaust gas conduit collar 224 has a constant or substantially constant diameter (e.g., a maximum diameter of the second exhaust gas conduit collar 224 is approximately equal to between 105% of a minimum diameter of the second exhaust gas conduit collar 224 and 95% of a minimum diameter of the second exhaust gas conduit collar 224, inclusive).

The second exhaust gas conduit collar 224 has a diameter that is larger than a diameter of the first exhaust gas conduit body 210. The second exhaust gas conduit collar 224 has an axial length (e.g., along an axis parallel to a center axis of the second exhaust gas conduit body 221, etc.) that is greater than the distance I or approximately equal to the distance I.

The second exhaust gas conduit end portion 222 also includes a second exhaust gas conduit end surface 225 (e.g., end face, etc.). The second exhaust gas conduit end surface 225 is a radially-extending end surface.

The insulated exhaust gas conduit system 200 also includes a second insulation sleeve 226. The second insulation sleeve 226 is disposed around (e.g., overlapped around, wrapped around, covers, overlaps, etc.) the second exhaust gas conduit 220. As is explained in more detail here, the second insulation sleeve 226 is configured to thermally insulate the second exhaust gas conduit 220 such that transfer of heat out of the second insulation sleeve 226 from the exhaust gas contained within (e.g., flowing through, etc.) the second exhaust gas conduit 220 is mitigated.

The second insulation sleeve 226 includes a second insulation sleeve insulation layer 227. As is explained in more detail herein, the second insulation sleeve insulation layer 227 is configured to reduce transfer of heat from exhaust gas contained within the second exhaust gas conduit 220 out of the insulated exhaust gas conduit system 200 (e.g., towards components of the exhaust gas aftertreatment system 100 that are adjacent to the second exhaust gas conduit 220, etc.).

The second insulation sleeve insulation layer 227 includes a second insulation sleeve insulation layer end surface 228 (e.g., end face, etc.). The second insulation sleeve insulation layer end surface 228 is separated from the second exhaust gas conduit end surface 225 by an overhang distance H. The overhang distance H is greater than the length Q.

The second insulation sleeve 226 also includes a second insulation sleeve heat shield 230 (e.g., wrap, covering, skin, shell, etc.). The second insulation sleeve heat shield 230 is configured to further reduce transfer of heat from exhaust gas contained within the second exhaust gas conduit 220 out of the insulated exhaust gas conduit system 200.

The second insulation sleeve heat shield 230 includes a second insulation sleeve heat shield body 232. The second insulation sleeve heat shield body 232 is disposed around the second insulation sleeve insulation layer 227. The second insulation sleeve heat shield body 232 is separated from the second exhaust gas conduit 220 by the second insulation sleeve insulation layer 227.

The second insulation sleeve heat shield 230 also includes a second insulation sleeve heat shield end portion 234. The second insulation sleeve heat shield end portion 234 is contiguous with the second insulation sleeve heat shield body 232. The second insulation sleeve heat shield end portion 234 extends away from the second insulation sleeve heat shield body 232. The second insulation sleeve heat shield end portion 234 is a radially-extending end portion.

In various embodiments, the second insulation sleeve heat shield end portion 234 interfaces with the second insulation sleeve insulation layer end surface 228. As a result, the second insulation sleeve insulation layer 227 is at least partially enveloped (e.g., covered, etc.) by the second insulation sleeve heat shield 230.

The first insulation sleeve 202 is configured to be engaged with (e.g., coupled to, confront, border, adjoin, connect with, attach to, etc.) the second insulation sleeve 226 such that the first insulation sleeve 202 receives the second insulation sleeve 226. When the first insulation sleeve 202 is engaged with the second insulation sleeve 226, the second exhaust gas conduit end portion 222 is received between the first insulation sleeve insulation layer end 208 and the first exhaust gas conduit 204 (e.g., the first exhaust gas conduit body 210, the first exhaust gas conduit end portion 211, etc.) and the first insulation sleeve heat shield end portion 218 is in confronting relation with (e.g., interfaces with, abuts, etc.) the second insulation sleeve heat shield end portion 234. The second insulation sleeve 226 is inserted into the first insulation sleeve 202, such that the first insulation sleeve heat shield end portion 218 is in confronting relation with the second insulation sleeve heat shield end portion 234 (e.g., the first insulation sleeve insulation layer 206 overlaps the second exhaust gas conduit 220 by the distance Q, etc.).

In operation, the second exhaust gas conduit end portion 222 is inserted into the channel 214 as the first insulation sleeve 202 is engaged with the second insulation sleeve 226 and the second insulation sleeve heat shield end portion 234 is brought into confronting relation with the first insulation sleeve heat shield end portion 218 as the first insulation sleeve 202 is engaged with the second insulation sleeve 226 (e.g., such that a portion of the second exhaust gas conduit body 221 between the second insulation sleeve heat shield end portion 234 and the second exhaust gas conduit collar 224 is at least partially covered by the first insulation sleeve insulation layer end 208, etc.).

In various embodiments, the insulated exhaust gas conduit system 200 may further include a first mounting component 238. The first mounting component 238 is inserted into the first exhaust gas conduit 204 such that the first mounting component 238 is disposed along a portion of an interior surface of the first exhaust gas conduit 204 (e.g., the first mounting component 238 is substantially cylindrical, etc.). The first mounting component 238 is coupled (e.g., fastened, affixed, etc.) to the first exhaust gas conduit 204. The first mounting component 238 interfaces with a first catalyst body 243, described herein, and separates the first catalyst body 243 from the first exhaust gas conduit 204. As such, the first mounting component 238 is configured to retain the first catalyst body 243 within the first exhaust gas conduit 204. The first mounting component 238 is further configured to reduce transfer of heat from exhaust gas contained within the first exhaust gas conduit 204 out of the insulated exhaust gas conduit system 200. In some embodiments, the first mounting component 238 includes a first mounting component end 240 that is contiguous with the first exhaust gas conduit end portion 211.

In various embodiments, the insulated exhaust gas conduit system 200 may further include a second mounting component 242. The second mounting component 242 is inserted into the second exhaust gas conduit 220 such that the second mounting component 242 is disposed along a portion of an interior surface of the second exhaust gas conduit 220 (e.g., the second mounting component 242 is substantially cylindrical). The second mounting component 242 is coupled (e.g., fastened, affixed, etc.) to the second exhaust gas conduit 220. The second mounting component 242 interfaces with a second catalyst body 245, described herein, and separates the second catalyst body 245 from the second exhaust gas conduit 220. As such, the second mounting component 242 is configured to retain the second catalyst body 245 within the second exhaust gas conduit 220. The second mounting component 242 is further configured to reduce transfer of heat from exhaust gas contained within the second exhaust gas conduit 220 out of the insulated exhaust gas conduit system 200. In some embodiments, the second mounting component 242 includes a second mounting component end 244 that is contiguous with the second exhaust gas conduit collar 224.

In various embodiments, the insulated exhaust gas conduit system 200 further includes the first catalyst body 243. The first catalyst body 243 is inserted into the first exhaust gas conduit 204. In embodiments where the insulated exhaust gas conduit system 200 includes the first mounting component 238, the first catalyst body 243 is inserted into the first mounting component 238. The first catalyst body 243 may be made from various ceramic materials (e.g., titanium oxide, etc.) and be configured to assist in the reduction of $NO_x$ emissions.

In various embodiments, the insulated exhaust gas conduit system 200 further includes the second catalyst body 245. The second catalyst body 245 is inserted into the second exhaust gas conduit 220. In embodiments where the insulated exhaust gas conduit system 200 includes the second mounting component 242, the second catalyst body 245 is inserted into the second mounting component 242. The second catalyst body 245 may be made from various ceramic materials (e.g., titanium oxide, etc.) and be configured to assist in the reduction of $NO_x$ emissions.

Figure 2:
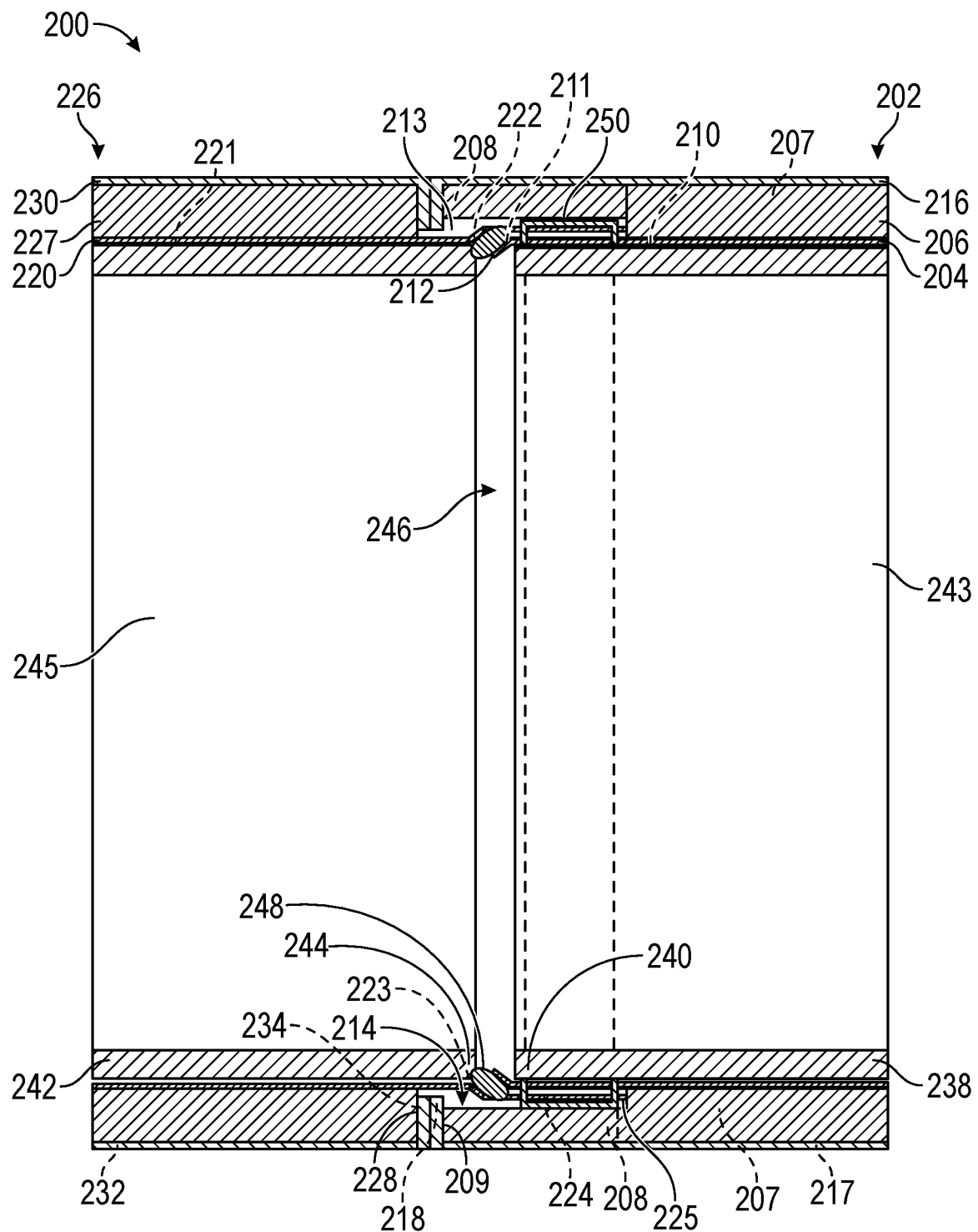
FIGS. 2 and 3 are cross-sectional views of an example insulated exhaust gas conduit system.
Figure 3:
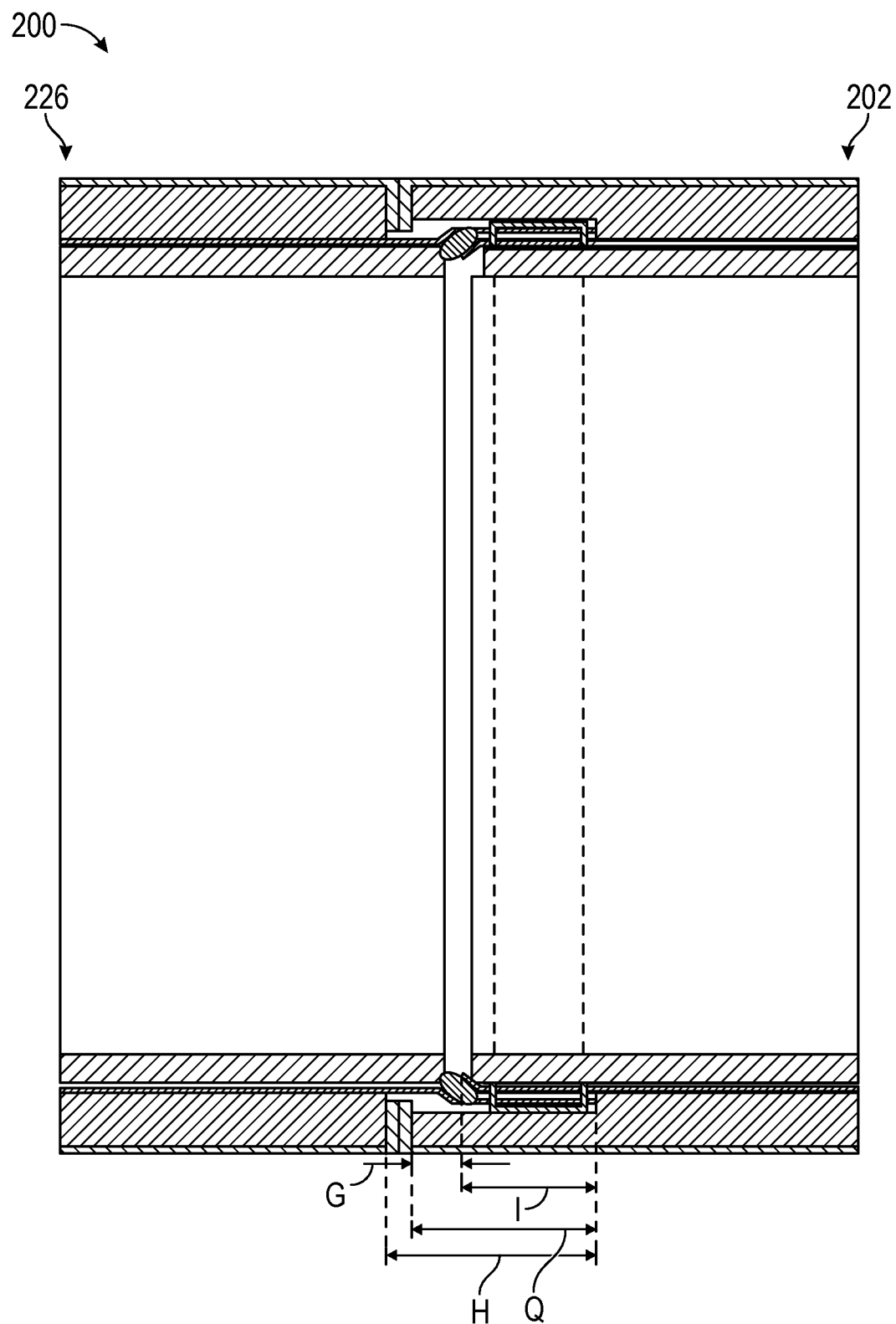

As shown in FIGS. 2 and 3, in some embodiments, a gap 246 is formed between the first mounting component 238 and the second mounting component 242 and/or between the first catalyst body 243 and the second catalyst body 245. The gap 246 is formed when the first insulation sleeve 202 and the second insulation sleeve 226 are engaged.

In some embodiments, the insulated exhaust gas conduit system 200 further includes a seal 248 (e.g., o-ring, etc.). The seal 248 is located between the second exhaust gas conduit end portion 222 and the first exhaust gas conduit end portion 211. For example, the seal 248 may be located between the first exhaust gas conduit end portion 211 and the second exhaust gas conduit flange 223. Compression of the seal 248 between the second exhaust gas conduit end portion 222 and the first exhaust gas conduit end portion 211 may establish a seal between the second exhaust gas conduit end portion 222 and the seal 248 and a seal between the first exhaust gas conduit end portion 211 and the seal 248. In various embodiments, the insulated exhaust gas conduit system 200 does not include the seal 248.

In various embodiments, the insulated exhaust gas conduit system 200 also includes an exhaust gas conduit clamp 250. The exhaust gas conduit clamp 250 is configured to secure the first exhaust gas conduit 204 and the second exhaust gas conduit 220 once the first insulation sleeve 202 is engaged with the second insulation sleeve 226. Additionally, the exhaust gas conduit clamp 250 may mitigate egress of exhaust gas out of the exhaust gas aftertreatment system 100 between the first exhaust gas conduit 204 and the second exhaust gas conduit 220 by causing the second exhaust gas conduit end portion 222 to be biased towards the first exhaust gas conduit 204, thereby causing compression of the seal 248 between the second exhaust gas conduit 220 and the first exhaust gas conduit 204 (e.g., between the second exhaust gas conduit collar 224 and the first exhaust gas conduit end portion 211, between the second exhaust gas conduit end portion 222 and the first exhaust gas conduit end portion 211, between the second exhaust gas conduit end portion 222 and the first exhaust gas conduit 204).

The exhaust gas conduit clamp 250 is placed around the second exhaust gas conduit end portion 222 (e.g., at the second exhaust gas conduit collar 224). The exhaust gas conduit clamp 250 is caused to be received within the channel 214 as the second insulation sleeve 226 is engaged with the first insulation sleeve 202. The exhaust gas conduit clamp 250 is tightened to cause the second exhaust gas conduit end portion 222 to be biased towards the first exhaust gas conduit 204, thereby causing compression at the seal 248 between the second exhaust gas conduit collar 224 and the first exhaust gas conduit end portion 211, between the second exhaust gas conduit end portion 222 and the first exhaust gas conduit end portion 211, and between the second exhaust gas conduit end portion 222 and the first exhaust gas conduit 204.

In various embodiments, the exhaust gas conduit clamp 250 is a band clamp. The size of the exhaust gas conduit clamp 250, or band clamp, is dependent on the size of the first and second exhaust gas conduits 204, 220. In various embodiments, the size may be approximately equal to between 3 inches and 6 inches in diameter, inclusive (e.g., 4 inches, 4.5 inches, 5 inches, etc.). In various embodiments, the size may be approximately equal to between 3 inches and 14 inches in diameter, inclusive (e.g., 6 inches, 13 inches, 13.5 inches, 14 inches, etc.). In various embodiments, the exhaust gas conduit clamp 250 may be a lap band clamp, hanger clamp, narrow band clamp, U-clamp, etc. In various embodiments, the exhaust gas conduit clamp 250 includes a connection portion 252. The connection portion 252 is configured to connect ends of the exhaust gas conduit clamp 250 to one another.

Figure 6:
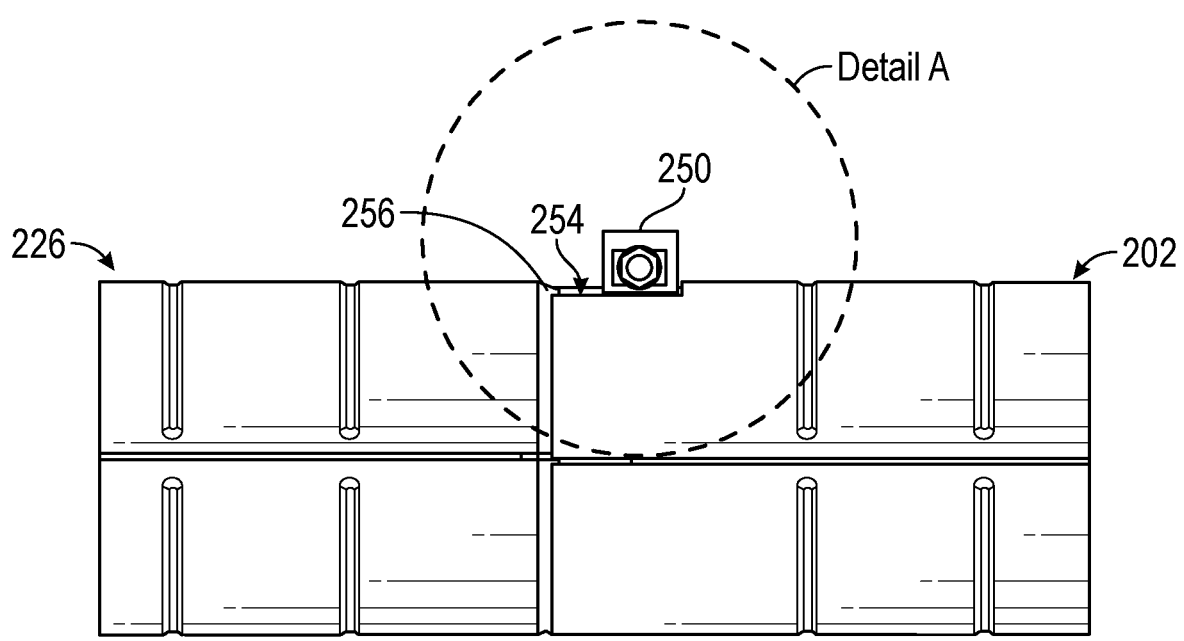
FIG. 6 is a side view of the example insulated exhaust gas conduit system shown in FIGS. 2 and 3.
Figure 7:
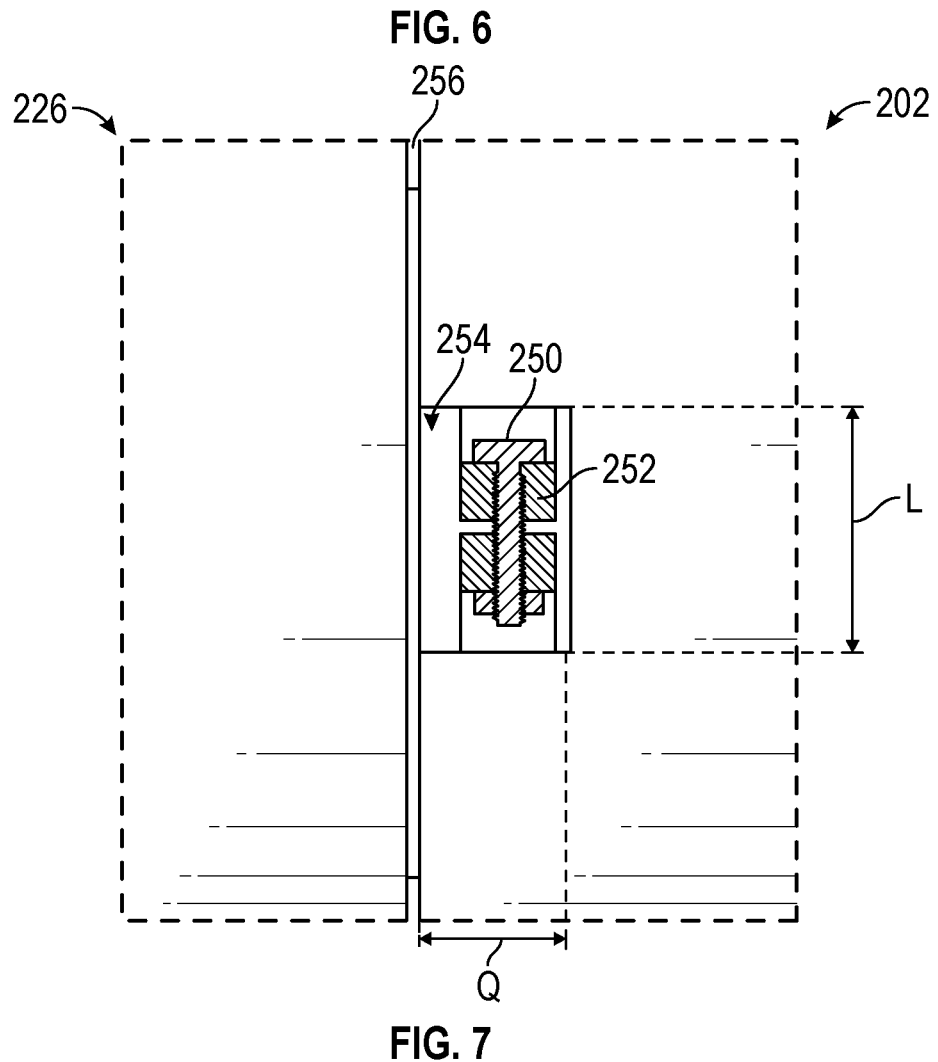
FIG. 7 is a top view of Detail A shown in FIG. 6.
Figure 8:
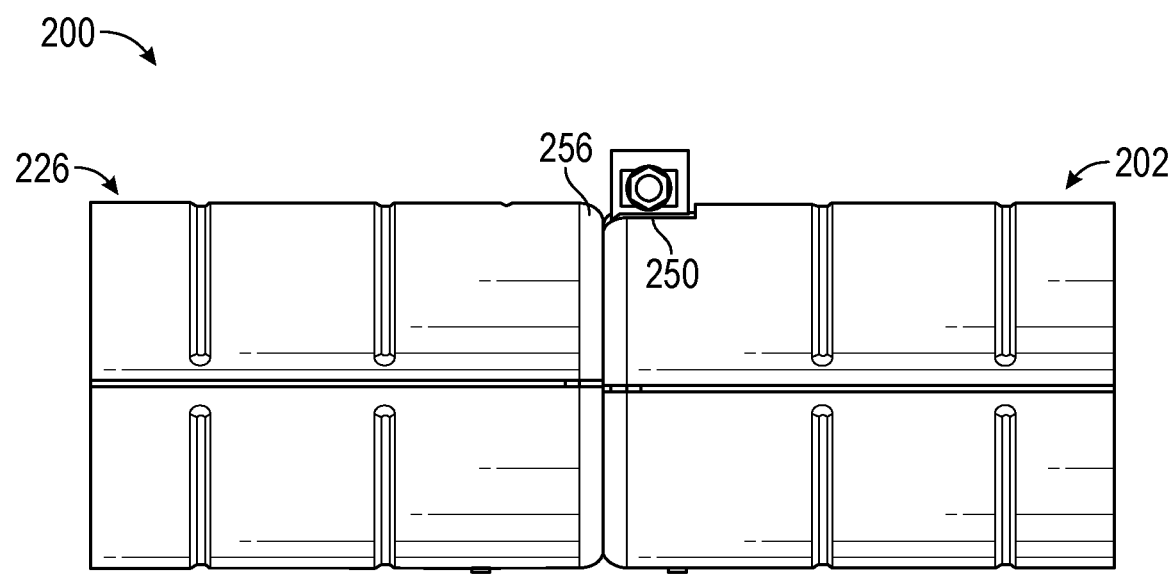
FIG. 8 is a side view of an example insulated exhaust gas conduit system.

Referring now to FIGS. 6-8, the connection portion 252 is illustrated, according to an example embodiment. In various embodiments, the first insulation sleeve insulation layer 206 includes a cutout portion 254. The cutout portion 254 is located on the surface of the first insulation sleeve insulation layer 206 which would align with the connection portion 252 when the exhaust gas conduit clamp 250 is coupled to the second exhaust gas conduit collar 224, and located over the channel 214. In these embodiments, the cutout portion 254 is a void in the first insulation sleeve insulation layer 206 of an area with a length L (e.g., a length longer than a length of the T-bolt of the exhaust gas conduit clamp 250)

and the distance Q. In various embodiments, the length of the T-bolt may be approximately equal to between 1 inch and 4 inches, inclusive (e.g., 3 inches, 3.5 inches, etc.). As such, the cutout portion 254 is configured to receive a portion of the exhaust gas conduit clamp 250 (e.g., the connection portion 252) when the second insulation sleeve 226 is engaged with the first insulation sleeve 202.

In various embodiments, the first insulation sleeve heat shield 216 may include a second cutout portion 254 which aligns the first cutout portion 254 of the first insulation sleeve insulation layer 206.

In various embodiments, the first insulation sleeve heat shield 216 and the second insulation sleeve heat shield 230 are configured such that a target void 256 is present between the first insulation sleeve heat shield end portion 218 and the second insulation sleeve heat shield end portion 234 when the second insulation sleeve 226 is engaged with the first insulation sleeve 202.

Figure 4:
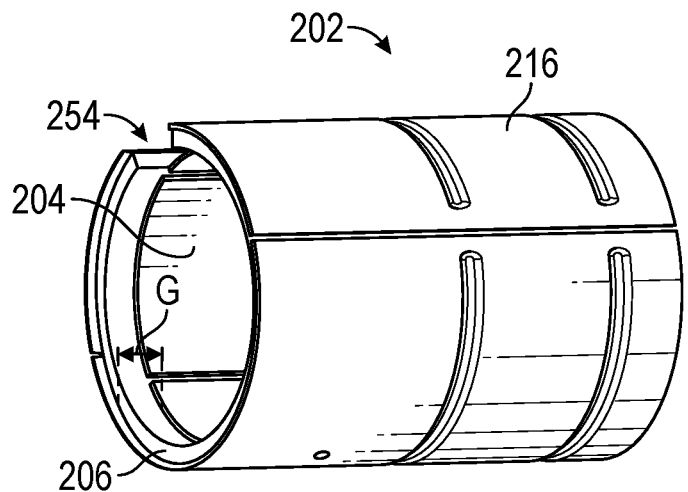
FIG. 4 is a perspective view of an example first insulation sleeve for the insulated exhaust gas conduit system shown in FIGS. 2 and 3.

As shown in FIGS. 4 and 6, the first insulation sleeve heat shield 216 and the second insulation sleeve heat shield 230 are configured such that the target void 256 between the first insulation sleeve heat shield end portion 218 and the second insulation sleeve heat shield end portion 234 when the second insulation sleeve 226 is engaged with the first insulation sleeve 202 is at least partially rectangular or square. Such a configuration for the target void 256 may be achieved by the first insulation sleeve heat shield end portion 218 being disposed along a plane that is parallel to a plane along which the second insulation sleeve heat shield end portion 234 is disposed. As such, the first insulation sleeve heat shield end portion 218 and the second insulation sleeve heat shield end portion 234 may be configured to interface along a plane, thus increasing a cross-sectional area of the target void 256.

Figure 5:
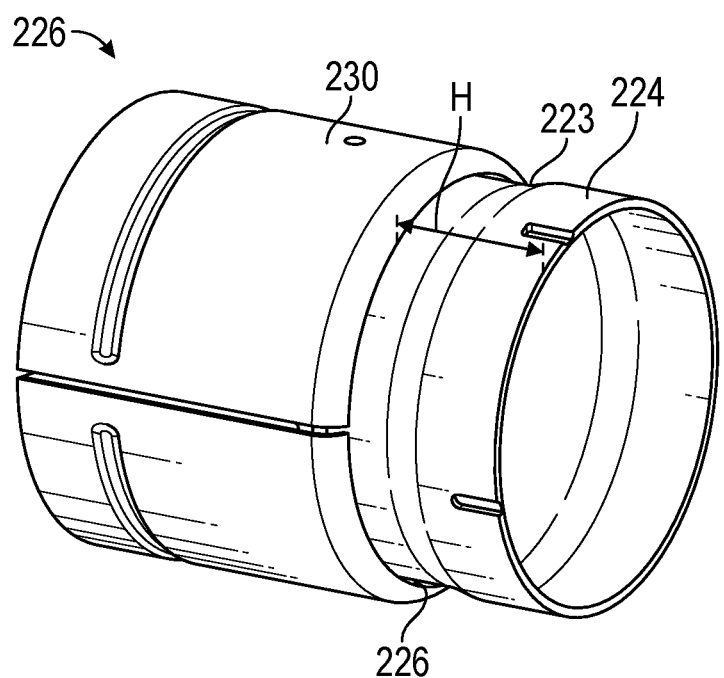
FIG. 5 is a perspective view of an example second insulation sleeve for the insulated exhaust gas conduit system shown in FIGS. 2 and 3.

As shown in FIGS. 5 and 8, the first insulation sleeve heat shield 216 and the second insulation sleeve heat shield 230 are configured such that the target void 256 between the first insulation sleeve heat shield end portion 218 and the second insulation sleeve heat shield end portion 234 when the second insulation sleeve 226 is engaged with the first insulation sleeve 202 is not partially rectangular or square (e.g., such that the target void 256 is partially arcuate, such that the target void 256 is partially circular, etc.). This may be achieved by the first insulation sleeve heat shield end portion 218 being disposed along a curve with a radius that is approximately equal to the radius of a curve along which the second insulation sleeve heat shield end portion 234 is disposed. As such, the first insulation sleeve heat shield end portion 218 and the second insulation sleeve heat shield end portion 234 may be configured to interface along an edge, thus decreasing a cross-sectional area of the target void 256.

Generally speaking, the first insulation sleeve insulation layer 206 and the second insulation sleeve insulation layer 227 and the first insulation sleeve heat shield 216 and the second insulation sleeve heat shield 230 insulate the first exhaust gas conduit 204 and the second exhaust gas conduit 220 such that even a joint (e.g., between the first exhaust gas conduit 204 and the second exhaust gas conduit 220) is insulated without the need for separate manufacturing, service parts, or processes. By eliminating the need for separate manufacturing, service parts, and processes, the cost and time associated with insulating the first exhaust gas conduit 204 and the second exhaust gas conduit 220 is decreased. For example, by reducing the number of components required to insulate two exhaust gas conduits, the cost and time requirement of manufacturing, installing, maintaining, replacing, etc. may be reduced. Additionally, by insulating the joint of the first exhaust gas conduit 204 and the second exhaust gas conduit 220, heat loss and pressure loss within the exhaust gas aftertreatment system 100 may be reduced, thus increasing the efficiency of the exhaust gas aftertreatment system 100.

In various embodiments, the first insulation sleeve insulation layer 206 and the second insulation sleeve insulation layer 227 may be slotted tubes. For instance, a slotted tube may open at a slot along the length-wise center of the tube and be slid around the first exhaust gas conduit 204 and the second exhaust gas conduit 220 such that the slot closes again once slotted tube is in place around the first exhaust gas conduit 204 and the second exhaust gas conduit 220. The slotted tube may simplify installation of the first insulation sleeve insulation layer 206 and the second insulation sleeve insulation layer 227.

In various embodiments, the first insulation sleeve insulation layer 206 and the second insulation sleeve insulation layer 227 may include a fibrous material (e.g., fiber glass insulation wraps, ceramic fiber wrap, etc.). In various embodiments, the first insulation sleeve insulation layer 206 and the second insulation sleeve insulation layer 227 may include an elastomeric coating. The first insulation sleeve insulation layer 206 and the second insulation sleeve insulation layer 227 may be formed in a single piece or in multiple pieces of insulation. The one or more pieces of insulation may be cut into a variety of lengths and sizes to fit a target size of the first exhaust gas conduit 204 and/or the second exhaust gas conduit 220. The first insulation sleeve heat shield 216 and the second insulation sleeve heat shield 230 similarly may be formed in a single piece or in multiple pieces.

By positioning the first insulation sleeve insulation layer 206 and the second insulation sleeve insulation layer 227 over the first exhaust gas conduit 204 and the second exhaust gas conduit 220 as described herein (e.g., at the joint between the first exhaust gas conduit 204 and the second exhaust gas conduit 220), a heat retention capability (e.g., insulation, etc.) of the exhaust gas aftertreatment system 100 is greater than in other systems which do not include such insulation systems. By improving heat retention, performance of the exhaust gas aftertreatment system 100 and/or an internal combustion engine associated with the exhaust gas aftertreatment system 100 may be improved. Further, insulating the joint between the first exhaust gas conduit 204 and the second exhaust gas conduit 220 reduces heat rejection to the surrounding components, improves the radial space claim, and reduces service time of the system. Additionally, the first insulation sleeve insulation layer 206 and the second insulation sleeve insulation layer 227 and the first insulation sleeve heat shield 216 and the second insulation sleeve heat shield 230, as described herein, may be used with piping upstream or downstream of an aftertreatment system. For instance, the first insulation sleeve insulation layer 206 and the second insulation sleeve insulation layer 227 and the first insulation sleeve heat shield 216 and the second insulation sleeve heat shield 230 may be applied to plain piping between an aftertreatment system and engine to similarly reduce heat loss/increase performance.

IV. Construction of Example Embodiments

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the implementations described above should not be understood as requiring such separation in all implementations, and it should be understood that the described components and systems can generally be integrated in a single product or packaged into multiple products embodied on tangible media.

As utilized herein, the term "substantially," "generally," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the present disclosure as recited in the appended claims. Additionally, it is noted that limitations in the claims should not be interpreted as constituting "means plus function" limitations under the United States patent laws in the event that the term "means" is not used therein.

The terms "coupled," "engaged," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to, or interfacing with, one another.

The terms "fluidly coupled" and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An insulated exhaust gas conduit system comprising:
   a first exhaust gas conduit having a first exhaust gas conduit end portion;
   a second exhaust gas conduit having a second exhaust gas conduit end portion configured to engage with the first exhaust gas conduit end portion;
   a first insulation sleeve comprising:
      a first insulation sleeve insulation layer; and
      a first insulation sleeve heat shield disposed around the first insulation sleeve insulation layer,
      wherein a first portion of the first insulation sleeve insulation layer is disposed around the first exhaust gas conduit, and a second portion of the first insulation sleeve insulation layer extends beyond the first exhaust gas conduit end portion and is disposed around the second exhaust gas conduit end portion, and the first portion and the second portion of the first insulation sleeve insulation layer are formed as a single continuous piece; and
   a second insulation sleeve comprising:
      a second insulation sleeve insulation layer disposed around the second exhaust gas conduit; and
      a second insulation sleeve heat shield disposed around the second insulation sleeve insulation layer,
      wherein the second exhaust gas conduit end portion is exposed from the second insulation sleeve, wherein:
   the first insulation sleeve insulation layer comprises:
      a first insulation sleeve insulation layer body interfacing with the first exhaust gas conduit; and
      a first insulation sleeve insulation layer end contiguous with the first insulation sleeve insulation layer body and separated from the first exhaust gas conduit;
   the first insulation sleeve heat shield comprises:
      a first insulation sleeve heat shield body interfacing with the first insulation sleeve insulation layer body and the first insulation sleeve insulation layer end; and
      a first insulation sleeve heat shield end portion contiguous with the first insulation sleeve heat shield body, the first insulation sleeve heat shield end portion interfacing with the first insulation sleeve insulation layer end and extending inward from the first insulation sleeve heat shield body towards the second exhaust gas conduit.

2. The insulated exhaust gas conduit system of claim 1, wherein:
   the second insulation sleeve insulation layer comprises:
      a second insulation sleeve insulation layer body interfacing with the second exhaust gas conduit; and
      a second insulation sleeve insulation layer end contiguous with the second insulation sleeve insulation layer body and interfacing with the second exhaust gas conduit;
   the second insulation sleeve heat shield comprises:
      a second insulation sleeve heat shield body interfacing with the second insulation sleeve insulation layer body and the second insulation sleeve insulation layer end; and a second insulation sleeve heat shield end portion contiguous with the second insulation sleeve heat shield body, the second insulation sleeve heat shield end portion interfacing with the second insulation sleeve insulation layer end and extending from the second insulation sleeve heat shield body towards the second exhaust gas conduit.

3. The insulated exhaust gas conduit system of claim 2, wherein the second insulation sleeve heat shield end portion is in confronting relation with the first insulation sleeve heat shield end portion.

4. The insulated exhaust gas conduit system of claim 1, wherein the second exhaust gas conduit comprises:
    a second exhaust gas conduit body that interfaces with the second insulation sleeve insulation layer and is separated from the second insulation sleeve heat shield by the second insulation sleeve insulation layer, the second exhaust gas conduit body having a first diameter; and
    wherein the second exhaust gas conduit end portion comprises:
        a second exhaust gas conduit flange that is contiguous with the second exhaust gas conduit body; and
        a second exhaust gas conduit collar that is contiguous with the second exhaust gas conduit flange and separated from the second exhaust gas conduit body by the second exhaust gas conduit flange, the second exhaust gas conduit collar having a second diameter greater than the first diameter.

5. The insulated exhaust gas conduit system of claim 1, wherein the second exhaust gas conduit end portion interfaces with the first exhaust gas conduit and the first insulation sleeve insulation layer.

6. The insulated exhaust gas conduit system of claim 1, wherein the first exhaust gas conduit end portion comprises a radially-extending end surface separated from the first insulation sleeve insulation layer end.

7. The insulated exhaust gas conduit system of claim 1, wherein the first exhaust gas conduit and the first insulation sleeve insulation layer cooperate to define a channel configured to receive the second exhaust gas conduit end portion.

8. The insulated exhaust gas conduit system of claim 7, wherein the channel is configured to receive the second exhaust gas conduit end portion, such that a portion of the first insulation sleeve is disposed around a portion of a main body of the second exhaust gas conduit before the second exhaust gas conduit end portion.

9. The insulated exhaust gas conduit system of claim 1, further comprising an exhaust gas conduit clamp, the exhaust gas conduit clamp comprising a connection portion that connects ends of the exhaust gas conduit clamp to one another, the exhaust gas conduit clamp configured to secure the first exhaust gas conduit to the second exhaust gas conduit.

10. The insulated exhaust gas conduit system of claim 9, wherein the first insulation sleeve comprises a cutout portion at which the connection portion of the exhaust gas conduit clamp is exposed from the first insulation sleeve.

11. The insulated exhaust gas conduit system of claim 1, wherein the first insulation sleeve heat shield body is separated from the first exhaust gas conduit by the first insulation sleeve insulation layer.

12. The insulated exhaust gas conduit system of claim 11, wherein the second insulation sleeve heat shield comprises:
    a second insulation sleeve heat shield body interfacing with the second insulation sleeve insulation layer and separated from the second exhaust gas conduit by the second insulation sleeve insulation layer; and
    a second insulation sleeve heat shield end portion interfacing with the second insulation sleeve insulation layer and extending from the second insulation sleeve heat shield body towards the second exhaust gas conduit, the second insulation sleeve heat shield end portion in confronting relation with the first insulation sleeve heat shield end portion.

13. An insulated exhaust gas conduit system comprising:
    a first exhaust gas conduit having a first exhaust gas conduit end portion;
    a second exhaust gas conduit having a second exhaust gas conduit end portion configured to couple to the first exhaust gas conduit end portion at a joint, the second exhaust gas conduit end portion comprising a flange configured to overlap the first exhaust gas conduit end portion at the joint;
    a first insulation layer disposed on the first exhaust gas conduit, wherein the first insulation layer extends beyond the first exhaust gas conduit end portion;
    a second insulation layer disposed on the second exhaust gas conduit, wherein the second insulation layer ends before the second exhaust gas conduit end portion, such that the second exhaust gas conduit end portion is exposed from the second insulation layer;
    a first heat shield disposed on the first insulation layer;
    a second heat shield disposed on the second insulation layer; and
    an exhaust gas conduit clamp configured to secure the first exhaust gas conduit to the second exhaust gas conduit at the joint, the exhaust gas conduit clamp having a connection portion that connect ends of the exhaust gas conduit clamp to one another, wherein a portion of the connection portion of the exhaust gas conduit clamp is located in a cutout portion of the first insulation layer and the first heat shield.

14. The insulated exhaust gas conduit system of claim 13, wherein the first exhaust gas conduit and the second exhaust gas conduit have a first diameter and the flange has a second diameter greater than the first diameter such that the flange is configured to receive the first exhaust gas conduit end portion when the second exhaust gas conduit is coupled to the first exhaust gas conduit.

15. The insulated exhaust gas conduit system of claim 13, wherein the first heat shield comprises a first end portion that covers a first end surface of the first insulation layer; and
    wherein the second heat shield comprises a second end portion that covers a second end surface of the second insulation layer and in confronting relation with the first end portion.

16. The insulated exhaust gas conduit system of claim 13, further comprising a first mounting component and a second mounting component disposed on an interior surface of the first exhaust gas conduit and the second exhaust gas conduit, respectively.

17. The insulated exhaust gas conduit system of claim 13, wherein the first exhaust gas conduit and the first insulation layer cooperate to define a channel configured to receive the second exhaust gas conduit end portion.

18. The insulated exhaust gas conduit system of claim 17, wherein the channel is configured such that a portion of the first insulation layer is disposed around a portion of a main body of the second exhaust gas conduit before the second exhaust gas conduit end portion and to receive the exhaust gas conduit clamp.

19. An insulated exhaust gas conduit system comprising:
a first exhaust gas conduit comprising:
  a first exhaust gas conduit body defined by a center axis; and
  a first exhaust gas conduit end portion contiguous with the first exhaust gas conduit body and extending from the first exhaust gas conduit body towards the center axis; and
a first insulation sleeve comprising:
  a first insulation sleeve insulation layer comprising:
    a first insulation sleeve insulation layer body in confronting relation with the first exhaust gas conduit; and
    a first insulation sleeve insulation layer end portion contiguous with the first insulation sleeve insulation layer body and separated from the first exhaust gas conduit; and
  a first heat shield comprising:
    a first heat shield body in confronting relation with the first insulation sleeve insulation layer body and separated from the first exhaust gas conduit by the first insulation sleeve insulation layer body; and
    a first heat shield end portion contiguous with the first heat shield body, in confronting relation with the first insulation sleeve insulation layer end portion, and extending away from the first heat shield body towards the center axis, the first heat shield end portion separated from the first exhaust gas conduit end portion along the center axis such that the first insulation sleeve insulation layer end portion extends between the first heat shield end portion and the first exhaust gas conduit end portion along the center axis.

20. An insulated exhaust gas conduit system comprising:
a first exhaust gas conduit having a first exhaust gas conduit end portion;
a second exhaust gas conduit having a second exhaust gas conduit end portion configured to engage with the first exhaust gas conduit end portion;
a first insulation sleeve comprising:
  a first insulation sleeve insulation layer; and
  a first insulation sleeve heat shield disposed around the first insulation sleeve insulation layer,
  wherein a first portion of the first insulation sleeve insulation layer is disposed around the first exhaust gas conduit, and a second portion of the first insulation sleeve insulation layer extends beyond the first exhaust gas conduit end portion and is disposed around the second exhaust gas conduit end portion, and the first portion and the second portion of the first insulation sleeve insulation layer are formed as a single continuous piece; and
a second insulation sleeve comprising:
  a second insulation sleeve insulation layer disposed around the second exhaust gas conduit; and
  a second insulation sleeve heat shield disposed around the second insulation sleeve insulation layer,
  wherein the second exhaust gas conduit end portion is exposed from the second insulation sleeve, wherein:
the second exhaust gas conduit comprises:
  a second exhaust gas conduit body that interfaces with the second insulation sleeve insulation layer and is separated from the second insulation sleeve heat shield by the second insulation sleeve insulation layer, the second exhaust gas conduit body having a first diameter; and
  wherein the second exhaust gas conduit end portion comprises:
    a second exhaust gas conduit flange that is contiguous with the second exhaust gas conduit body; and
    a second exhaust gas conduit collar that is contiguous with the second exhaust gas conduit flange and separated from the second exhaust gas conduit body by the second exhaust gas conduit flange, the second exhaust gas conduit collar having a second diameter greater than the first diameter.

21. An insulated exhaust gas conduit system comprising:
a first exhaust gas conduit having a first exhaust gas conduit end portion;
a second exhaust gas conduit having a second exhaust gas conduit end portion configured to engage with the first exhaust gas conduit end portion;
a first insulation sleeve comprising:
  a first insulation sleeve insulation layer; and
  a first insulation sleeve heat shield disposed around the first insulation sleeve insulation layer,
  wherein a first portion of the first insulation sleeve insulation layer is disposed around the first exhaust gas conduit, and a second portion of the first insulation sleeve insulation layer extends beyond the first exhaust gas conduit end portion and is disposed around the second exhaust gas conduit end portion, and the first portion and the second portion of the first insulation sleeve insulation layer are formed as a single continuous piece;
a second insulation sleeve comprising:
  a second insulation sleeve insulation layer disposed around the second exhaust gas conduit; and
  a second insulation sleeve heat shield disposed around the second insulation sleeve insulation layer,
  wherein the second exhaust gas conduit end portion is exposed from the second insulation sleeve; and
an exhaust gas conduit clamp, the exhaust gas conduit clamp comprising a connection portion that connects ends of the exhaust gas conduit clamp to one another, the exhaust gas conduit clamp configured to secure the first exhaust gas conduit to the second exhaust gas conduit.

22. An insulated exhaust gas conduit system comprising:
a first exhaust gas conduit having a first exhaust gas conduit end portion;
a second exhaust gas conduit having a second exhaust gas conduit end portion configured to engage with the first exhaust gas conduit end portion;
a first insulation sleeve comprising:
  a first insulation sleeve insulation layer; and
  a first insulation sleeve heat shield disposed around the first insulation sleeve insulation layer, the first insulation sleeve heat shield comprising:
    a first insulation sleeve heat shield body interfacing with the first insulation sleeve insulation layer and separated from the first exhaust gas conduit by the first insulation sleeve insulation layer, and
    a first insulation sleeve heat shield end portion interfacing with the first insulation sleeve insulation layer and extending from the first insulation sleeve heat shield body towards the first exhaust gas conduit;
  wherein a first portion of the first insulation sleeve insulation layer is disposed around the first exhaust gas conduit, and a second portion of the first insulation sleeve insulation layer extends beyond the first exhaust gas conduit end portion and is disposed around the second exhaust gas conduit end portion, and the first portion and the second portion of the first insulation sleeve insulation layer are formed as a single continuous piece; and a second insulation sleeve comprising:
   a second insulation sleeve insulation layer disposed around the second exhaust gas conduit; and
   a second insulation sleeve heat shield disposed around the second insulation sleeve insulation layer,
   wherein the second exhaust gas conduit end portion is exposed from the second insulation sleeve.

\* \* \* \* \*